(12) United States Patent
Egatz-Gomez et al.

(10) Patent No.: US 12,017,924 B2
(45) Date of Patent: *Jun. 25, 2024

(54) CONTINUOUS SYNTHESIS OF UPCONVERTING NANOPARTICLES

(71) Applicant: Arizona Board of Regents on behalf of Arizona State University, Scottsdale, AZ (US)

(72) Inventors: Ana Egatz-Gomez, Phoenix, AZ (US); Alexandra Ros, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,501

(22) Filed: Apr. 6, 2023

(65) Prior Publication Data
US 2023/0242412 A1    Aug. 3, 2023

Related U.S. Application Data

(63) Continuation of application No. 17/237,836, filed on Apr. 22, 2021, now Pat. No. 11,649,173.
(Continued)

(51) Int. Cl.
*C01F 17/36* (2020.01)
*B01J 19/00* (2006.01)
(Continued)

(52) U.S. Cl.
CPC .......... *C01F 17/36* (2020.01); *B01J 19/0013* (2013.01); *B01J 19/126* (2013.01); *C01F 17/265* (2020.01);
(Continued)

(58) Field of Classification Search
CPC .. C09K 11/7773; C01F 17/36; C01P 2004/38; C01P 2004/64; B01J 19/126;
(Continued)

(56) References Cited

U.S. PATENT DOCUMENTS

| 11,649,173 B2* | 5/2023 | Egatz-Gomez ......... C01F 17/36 252/301.4 H |
| 2021/0332294 A1 | 10/2021 | Egatz-Gomez et al. |

OTHER PUBLICATIONS

Chen et al., "Ionic liquid-based route to spherical NaYF4 nanoclusters with the assistance of microwave radiation and their multicolor upconversion luminescence," Langmuir, 2010, 26(11) 8797-8803.*
(Continued)

*Primary Examiner* — C Melissa Koslow
(74) *Attorney, Agent, or Firm* — Fish & Richardson P.C.

(57) ABSTRACT

Synthesizing upconverting nanoparticles includes heating a precursor solution comprising one or more rare earth salts, an alkali metal salt or alkaline earth salt, and a solvent comprising a plasticizer in a microwave reactor to yield a product mixture, and cooling the product mixture to yield the upconverting nanoparticles. Core-shell upconverting nanoparticles are synthesized by combining the upconverting nanoparticles with a precursor solution comprising one or more rare earth salts, an alkali metal salt or alkaline earth salt, and a solvent comprising a plasticizer to yield a nanoparticle mixture, heating the nanoparticle mixture in a microwave reactor to yield a product mixture, and cooling the product mixture to yield the core-shell upconverting nanoparticles.

18 Claims, 4 Drawing Sheets

Related U.S. Application Data

(60) Provisional application No. 63/013,857, filed on Apr. 22, 2020.

(51) Int. Cl.

| | |
|---|---|
| *B01J 19/12* | (2006.01) |
| *B82Y 30/00* | (2011.01) |
| *B82Y 40/00* | (2011.01) |
| *C01F 17/265* | (2020.01) |
| *C09K 11/02* | (2006.01) |
| *C09K 11/77* | (2006.01) |

(52) U.S. Cl.
CPC ........ *C09K 11/025* (2013.01); *C09K 11/7773* (2013.01); *B01J 2219/00033* (2013.01); *B01J 2219/00141* (2013.01); *B01J 2219/00162* (2013.01); *B01J 2219/00166* (2013.01); *B82Y 30/00* (2013.01); *B82Y 40/00* (2013.01); *C01P 2004/38* (2013.01); *C01P 2004/64* (2013.01); *C01P 2006/60* (2013.01)

(58) Field of Classification Search
CPC .... B01J 2219/00033; B01J 2219/00141; B01J 2219/00166
See application file for complete search history.

(56) References Cited

OTHER PUBLICATIONS

Halimi et al., "Pick your precursor! Tailoring the size and crystal phase of microwave-synthesized sub-10 nm upconverting nanoparticles," Journal of Materials Chemistry C, 2019, 7(48): 15364-15374.*

Amouroux et al., "Importance of the Mixing and High-Temperature Heating Steps in the Controlled Thermal Coprecipitation Synthesis of Sub-5-nm Na (Gd—Yb) F4: Tm," Inorganic Chemistry, 2019, 58(8):5082-5088.

Bilecka et al., "Microwave chemistry for inorganic nanomaterials synthesis," Nanoscale, 2010, 2(8):1358-1374.

Chen et al., "A facile synthesis of water-soluble BaYF5:Ln3 + NCs with excellent luminescent properties as promising contrast agent for dual-modal bioimaging," Inorganic Chemistry Communications, 2015, 62:11-14.

Crossley, "Dielectric relaxation of 1-alkenes," The Journal of Chemical Physics, 1973, 58(12):5315-5318.

Egatz-Gomez et al., "One-pot microwave synthesis of upconverting nanoparticles for biosensing," Poster, Microfluidics, EMBL Heidelberg, Germany, Jul. 24-26, 2016, 1 page.

Fannin et al., "Microwave dielectric properties of magnetite colloidal particles in magnetic fluids," Journal of Physics: Condensed Matter, 2007, 19(3):036104.

LaMer et al., "Theory, production and mechanism of formation of monodispersed hydrosols," Journal of the American Chemical Society, 1950, 72(11):4847-4854.

Li et al., "Hydrophilic, Upconverting, Multicolor, Lanthanide-Doped NaGdF4 Nanocrystals as Potential Multifunctional Bioprobes," Chemistry—A European Journal, 2012, 18(37):11641-11646.

Li et al., "Microwave-assisted synthesis and up-down conversion luminescent properties of multicolor hydrophilic LaF3:Ln3 nanocrystals," Dalton Transactions, 2013, 42(6):2015-2022.

Lim et al., "Microwave sol-gel synthesis and upconversion photoluminescence properties of CaGd2(WO4)4:Er3+/Yb3+ phosphors with incommensurately modulated structure," Journal of Solid State Chemistry, 2015, 228:160-166.

Liu et al., "Cubic versus hexagonal-effect of host crystallinity on the T1 shortening behaviour of NaGdF4 nanoparticles," Nanoscale, 2019, 11(14):6794-6801.

Liu et al., "Upconversion nanoparticle-based fluorescence resonance energy transfer assay for Cr (III) ions in urine," Analytica Chimica Acta, 2013, 761:178-185.

Mackenzie et al., "The theoretical molecular weight of NaYF4:RE upconversion nanoparticles," Scientific Reports, 2018, 8(1):1106, 11 pages.

Naccache et al., "The Fluoride Host: Nucleation, Growth, and Upconversion of Lanthanide-Doped Nanoparticles," Advanced Optical Materials, 2015, 3(4):482-509.

Nayak et al., "Dielectric relaxation studies of glass formation in some esters of phthalic acid," The Journal of Chemical Physics, 1993, 99(3):1607-1613.

Niu et al., "Rapid microwave reflux process for the synthesis of pure hexagonal NaYF4: Yb3+, Ln3+,Bi3+ (Ln3+ = Er3+, Tm3+, Ho3+) and its enhanced UC luminescence," Journal of Materials Chemistry, 2012, 22(40):21613-21623.

Nüchter et al., "Microwave assisted synthesis-a critical technology overview," Green Chemistry, 2004, 6(3):128-141.

Panov et al., "Microwave-Assisted Solvothermal Synthesis of Upconverting and Downshifting Rare-Earth-Doped LiYF4 Microparticles," Inorganic Chemistry, 2018, 57(23):14920-14929.

Quintanilla et al., "Light management in upconverting nanoparticles: ultrasmall core/shell architectures to tune the emission color," ACS Photonics, 2014, 1(8):662-669.

Rao et al., "Synthesis of inorganic solids using microwaves," Chemistry of Materials, 1999, 11(4):882-895.

Reddy et al., "Microwave-assisted one-step synthesis of acetate-capped NaYF4:Yb/Er upconversion nanocrystals and their application in bioimaging," Journal of Materials Science, 2017, 52(10):5738-5750.

Som et al., "Enhanced upconversion of NaYF4:Er3+/Yb3+ phosphors prepared via the rapid microwave-assisted hydrothermal route at low temperature: phase and morphology control," Optics Letters, 2016, 41(3):464-467.

Subramanian et al., "Relaxation Studies of Ternary Mixtures of Dibutyl Phthalate with Octanol and Isobutanol in Benzene in the Microwave Region," International Journal of Scientific Research And Education, 2016, 4:4810-4817.

Tong et al., "Comparative study on upconversion luminescence and temperature sensing of α- and β-NaYF4:Yb3+/Er3+ nano-/microcrystals derived from a microwave-assisted hydrothermal route," Journal of Luminescence, 2015, 167:386-390.

Ullah et al., "Microwave-assisted synthesis of NaYF 4: Yb 3+/Tm 3+ upconversion nanoparticles with tailored morphology and phase for the design of UV/NIR-active NaYF 4: Yb 3+/Tm 3+@ TiO 2 core@shell photocatalysts," CrystEngComm, 2017, 19(25):3465-3475.

Wang et al., "Monodisperse upconversion GdF3: Yb, Er rhombi by microwave-assisted synthesis," Nanoscale Research Letters, 2011, 6(1):267, 5 pages.

Wang et al., "Monodisperse upconverting nanocrystals by microwave-assisted synthesis," ACS Nano, 2009, 3(11):3804-3808.

Wang et al., "Rapid microwave-enhanced hydrothermal synthesis and shape evolution of uniform NaGdF4:Yb, Er (Tm/Ho) nanocrystals with upconversion and paramagnetic properties," Nanotechnology, 2012, 23(22):225705, 11 pages.

Wang et al., "Size and shape evolution of upconverting nanoparticles using microwave assisted synthesis," CrystEngComm, 2010, 12(7):1993-1996.

Yuan et al., "Multiple morphologies of YF3: Eu3+ microcrystals: Microwave hydrothemal synthesis, growth mechanism and luminescence properties," Ceramics International, 2016, 42(1):1513-1520.

Zhao et al., "Microwave-assisted solvothermal synthesis and upconversion luminescence of CaF2: Yb3+/Er3+ nanocrystals," Journal of Colloid and Interface Science, 2015, 440:39-45.

* cited by examiner

CONTINUOUS SYNTHESIS OF UPCONVERTING NANOPARTICLES

CROSS-REFERENCE TO RELATED APPLICATIONS

This application is a continuation of U.S. patent application Ser. No. 17/237,836 entitled "CONTINUOUS SYNTHESIS OF UPCONVERTING NANOPARTICLES" and filed on Apr. 22, 2021, now U.S. Pat. No. 11,649,173, which claims the benefit of U.S. Patent Application No. 63/013,857 entitled "CONTINUOUS SYNTHESIS OF UPCONVERTING NANOPARTICLES" and filed on Apr. 22, 2020, which are incorporated herein by reference in their entirety.

TECHNICAL FIELD

This invention relates to continuous synthesis of upconverting nanoparticles in a fluidly coupled series of microwave reactors.

BACKGROUND

Upconverting nanoparticles (UCNPs) are nanoparticles that absorb two or more photons of relatively low energy (e.g., 800 nm to 1000 nm) and emit a single photon with higher energy (e.g., 350 nm to 800 nm). In this upconversion process, there is a large anti-Stokes shift between excitation and emission. The emission bands are narrow, and there is no overlap between the excitation and emission bands. UCNPs can be used for multimodal optical-electron microscopy or magnetic resonance imaging. These particles typically do not photobleach, even at high excitation power and duration, and can be excited by relatively low-power, continuous-wave infrared lasers. Since infrared excitation is not photodamaging, does not excite background fluorescence, and has a deeper penetration in tissues than UV or visible excitation, these nanoparticles can be used for live animal and cell imaging, archived tissue imaging, and intraoperative imaging.

SUMMARY

Methods described in this disclosure allow fabrication of upconverting nanoparticles (UCNPs) in a scalable, continuous flow fashion using a microwave reactor using moderately polar, high boiling point solvent (e.g., plasticizers mixed with oleic acid). These methods demonstrate an increase in production output over current methods by at least a factor of twenty, thereby making UCNPs more suitable for imaging applications (e.g., intraoperative imaging during surgery of tumors).

In a first general aspect, synthesizing upconverting nanoparticles includes heating a precursor solution comprising one or more rare earth salts, an alkali metal salt or an alkaline earth salt, and a solvent in a microwave reactor to yield a product mixture; and cooling the product mixture to yield the upconverting nanoparticles. The solvent comprises a plasticizer including one or both of dioctyl terephthalate and bis(2-ethylhexyl) adipate.

Implementations of the first general aspect may include one or more of the following features.

At least one of the one or more rare earth salts comprises trifluoroacetate. One or more of the rare earth salts comprise one or more of yttrium, ytterbium, and erbium. The solvent further comprises oleic acid.

A boiling point of the plasticizer at atmospheric pressure is at least 320° C. A dielectric permittivity of the plasticizer is at least 4 or at least 5. The plasticizer may further include dibutyl phthalate.

The first general aspect may include heating the precursor solution to a temperature of at least 280° C. or at least 305° C. Heating the product mixture can include heating for a length of time between 5 minutes and 45 minutes.

Some implementations of the first general aspect include flowing the precursor solution through the microwave reactor.

In a second general aspect, synthesizing core-shell upconverting nanoparticles includes heating a precursor solution comprising one or more rare earth metal salts, an alkali metal salt or an alkaline earth metal salt, and a solvent in a microwave reactor; combining the upconverting nanoparticles of the first general aspect with the precursor solution to yield a nanoparticle mixture; heating the nanoparticle mixture to yield a product mixture; and cooling the product mixture to yield the core-shell upconverting nanoparticles. The solvent comprises a plasticizer including one or both of dioctyl terephthalate and bis(2-ethylhexyl) adipate.

Implementations of the second general aspect may include one or more of the following features.

The upconverting nanoparticles can have a cubic crystal structure or a hexagonal crystal structure. A boiling point of the plasticizer at atmospheric pressure is at least 320° C. A dielectric permittivity of the plasticizer is at least 4 or at least 5. The plasticizer may further include dibutyl phthalate.

The second general aspect may include heating the precursor solution to a temperature of at least 280° C. or at least 305° C.

Some implementations of the second general aspect include flowing the precursor solution through the microwave reactor.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 1A depicts a batch apparatus, and FIG. 1B depicts a continuous flow apparatus.

DETAILED DESCRIPTION

Figure 1A:
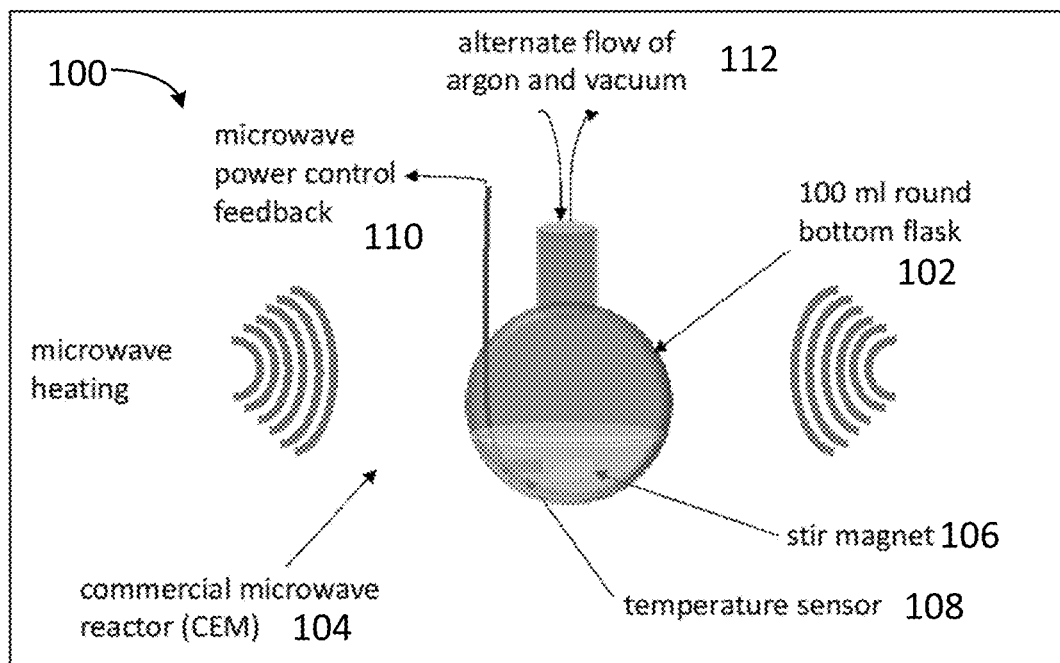
FIGS. 1A and 1B are schematic representations of microwave flow reactor configurations for upconverting nanoparticle (UCNP) synthesis.

The ability to govern the nucleation and growth processes in liquid media can be a key to controlling the features of nanoparticles. Solvothermal synthesis of upconverting nanoparticles (UCNPs) involves the decomposition of precursors of fluoride and lanthanide ions at high temperature in the presence of a coordinating ligand and a high-boiling point solvent medium for decomposition reaction to occur. A fine control of the reaction temperature can aid in obtaining UCNPs that are homogeneous both in size and crystalline structure. A high degree of monodispersity can require a high rate of nucleation leading to burst nucleation that precludes further nucleation during nanoparticle growth. The cubic (α) to hexagonal (β) transformation requires prolonged heating for completion.

Conventional heating depends on convection currents and the thermal conductivity from the heating device to the medium. A gradual temperature increase can affect nucleation and produce broader nanoparticle size distributions. It can also yield a mixture of particles with cubic and hexagonal crystalline phases, since the reaction time is measured only once the internal temperature is stabilized. On the other hand, using microwave-assisted synthesis, the reaction can be brought up from room temperature to 300° C. in minutes, since heat can be rapidly and uniformly generated within a certain depth of the reaction mixture, depending on the ability of the reaction mixture components to absorb microwave radiation.

This disclosure describes synthesis of UCNPs by preparing a precursor solution, heating the precursor solution in one or more heating phases to nucleate and grow the UCNPs, and quenching the reaction. The UCNPs can be prepared in 15-150 minutes reactor time in a one-pot synthesis method. Due at least in part to fast and homogeneous microwave heating, it is possible to obtain a narrow size distribution of 10 nm to 20 nm. The nanoparticles can form stable colloidal dispersions (e.g., in isopropanol) at concentrations as high as 2 mg/mL.

Preparing the precursor solution includes combining a solvent and precursor salts in stoichiometric amounts to yield a mixture. The mixture is heated while stirring under alternating inert gas and vacuum to remove residual air and water to yield the precursor solution. The precursor solution is rapidly heated to a temperature above 280° C. in a microwave reactor. Heating the mixture can include two or more intermediate heating phases (e.g., typically at 110° C., 220° C., or up to 280° C. for cubic-phase crystalline particles, or 305° C. for hexagonal phase crystalline particles). Each heating phase can range from about 5 minutes to about 30 minutes in length. After nanoparticle nucleation and growth, the reaction is quenched by cooling the mixture with compressed air to room temperature (e.g., with a minimum average cooling rate of 20° C./min) to yield UCNPs.

Suitable precursor salts include acetate and trifluoroacetate salts of alkali metals, alkali rare earth metals, and rare earth elements (Sc, Y, and lanthanides). The precursor salts amounts are calculated stoichiometrically for a final combined rare earth concentration between 1 to 30 millimolar, such that the resulting nanoparticles include a crystalline matrix of a fluoride, for example, $NaYF_4$, $NaGdF_4$, $KGdF_4$, $LiYF_4$, $YbF_3$, or $YF_3$, doped with lanthanides (i.e., partially replacing the Y or Gd ion from 0.1 to 100% with one or more lanthanide ions), typically, Er/Yb, Tm/Yb, or Tb/Yb (e.g., $NaYF_4$).

The solvent is typically an organic solvent. Suitable solvents include a mixture of oleic acid and a high boiling point (e.g., 320° C. or greater), high dielectric permittivity (e.g., at least 4) plasticizer (e.g., dibutyl phthalate, dioctyl terephthalate, bis(2-ethylhexyl) adipate). Other high boiling point plasticizer esters with a dielectric permittivity larger than 4 are also suitable. The high boiling point, good chemical stability at high temperature, and moderately polar character makes di-n-butyl-phthalate well suited for microwave synthesis. Oleic acid is used as a ligand to control the size and shape of the nanoparticles. Non-coordinating solvent 1-octadecene is a very low-microwave absorber and thus not ideal for this application. Table 1 lists boiling point and dielectric permittivity (ε) of various solvents.

TABLE 1

| Solvent properties | | |
| --- | --- | --- |
| Solvent | Boiling Point (° C.) | ε |
| 1-octadecene | 315 | 2.1 |
| oleic acid | 350 | 2.46 |
| di-n-butyl-phthalate | 340 | 6.43 |

Core-shell nanoparticles can be synthesized by mixing a suspension of cubic or hexagonal core nanoparticles (e.g. $NaYF_4$ Er, Yb) with a precursor solution (e.g., a precursor made with acetate and trifluoroacetate salts of sodium and ytterbium in stoichiometric ratios to yield $NaYbF_4$) to yield a mixture, and heating the mixture in a microwave reactor with a program similar to that used to obtain core upconversion nanoparticles to yield, for example $NaYF_4$:Er, Yb@$NaYbF_4$ (core @ shell) nanoparticles.

Figure 1B:
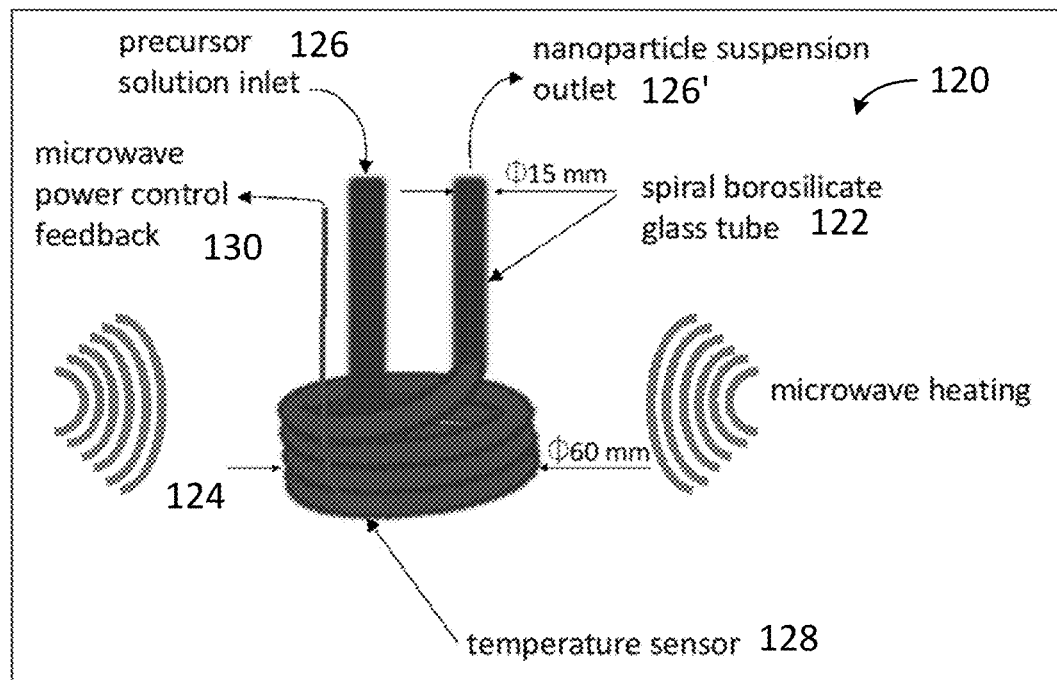

FIGS. 1A and 1B depict microwave flow reactor configurations for UPNP synthesis. FIG. 1A depicts a batch apparatus 100 for UPNP synthesis. Apparatus 100 includes reaction vessel 102 positioned in microwave reactor 104 for receiving the precursor solution. As depicted, reaction vessel 102 is a round bottom flask. However, reaction vessels of other sizes and shapes can be used. Apparatus 100 includes stirrer 106, temperature sensor 108, and microwave power control feedback 110. Opening 112 in reaction vessel 102 provides access for flow of an inert gas (e.g., argon) and evacuation inside the reaction vessel. The flow of gas and evacuation can be alternated.

FIG. 1B depicts continuous flow apparatus 120 for synthesis of UPNPs by continuously flowing a precursor solution through the apparatus. Reaction vessel 122 is depicted as a spiral borosilicate glass tube positioned in microwave reactor 124. However, reaction vessels of other sizes and shapes can be used. A precursor solution is provided to inlet 126, and a nanoparticle suspension leaves reaction vessel 122 through outlet 126'. Continuous flow apparatus 120 includes temperature sensor 128 and microwave power control feedback 130. In one example, a particle yield of 30 mg UCNPs per minute can be obtained in an apparatus having a reaction vessel with a volume per coil of 50 mL, 3 coil turns, a precursor flow rate of 15 mL/minute, a residency time of 10 minutes, and a particle concentration of 2 mg/mL.

In many microwave reactors the sample usually is irradiated at one point rather than over the whole sample volume. Because different materials absorb microwaves differently, efficient mixing and fast-responding temperature control is advantageous. Reactor flow, such as that provided by the apparatus depicted in FIG. 1B, allows efficient mixing on a macro- or microfluidic scale.

The heating rate in a microwave reactor correlates with the complex dielectric permittivity of the reaction components. The microwave absorption cross-section and penetration depth depend on the real part of the dielectric permittivity ε', while heating due to the dielectric loss through dissipative phenomena is represented by the imaginary part of the dielectric permittivity ε".

As described herein, a mixture of high boiling point polycarboxylic acid esters and oleic acid (OA) is used in the formation UCNPs. Polycarboxylic acid esters (e.g., bis(2-ethylhexyl) adipate (BEHA), di-n-butyl phthalate (DBP), and di-iso-octyl terephthalate (DOTP)) act as solvents with high boiling points and temperature stability. They are soluble in most organic solvents, and have adequate polar and microwave absorbing characteristics.

In some implementations, a continuous flow apparatus includes one or more (e.g., three) fluidly coupled microwave reactors configured such that the precursor solution flows sequentially through each reactor to yield UCNPs.

Figure 2:
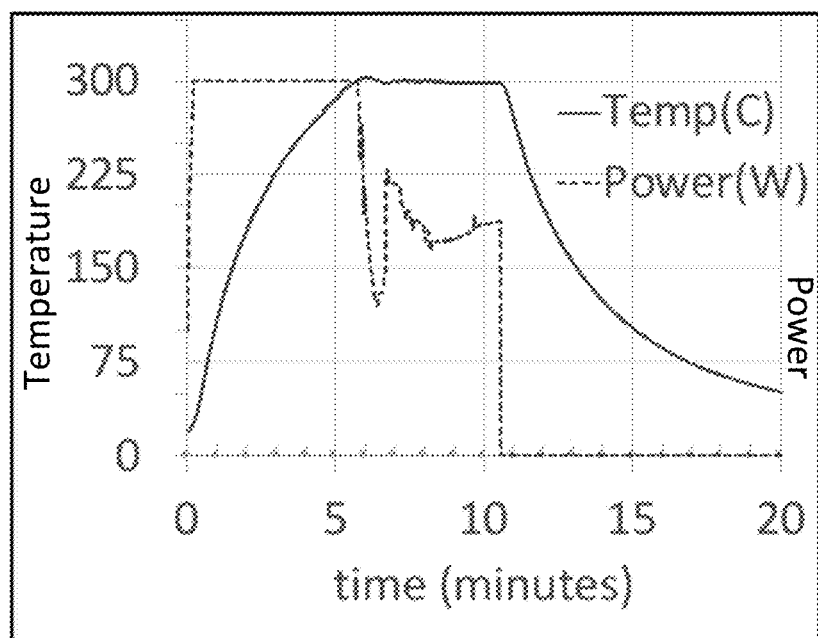
FIG. 2 shows a typical power and temperature vs. time plot using a commercial microwave reactor for making nanoparticles.

FIG. 2 shows a typical power and temperature vs. time plot using a commercial microwave reactor for making UCNPs. For the plot in FIG. 2, the precursor solution was heated for 5 minutes to 300° C.

Figure 3:
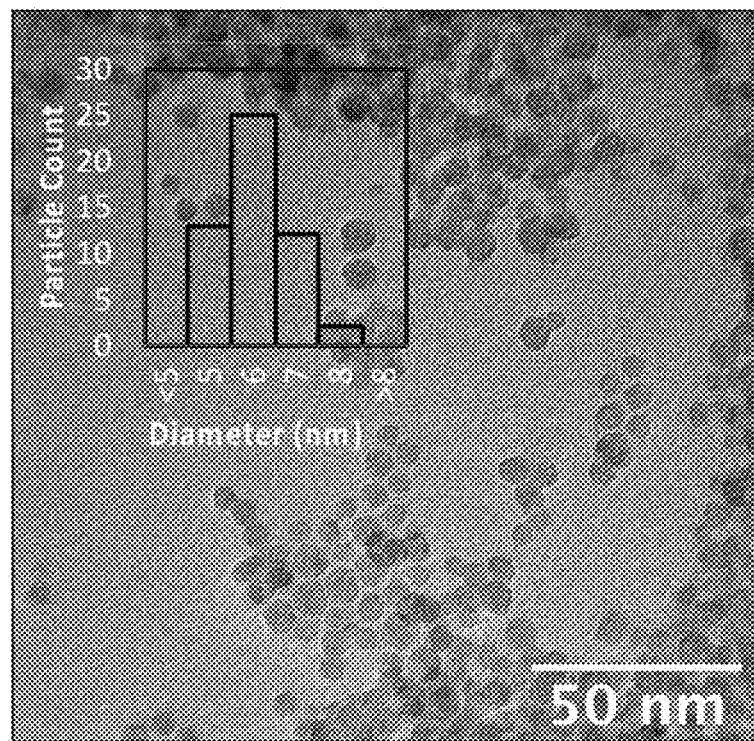
FIG. 3 is a transmission electron microscopy (TEM) image of $NaYF_4:Er_{0.02}, Yb_{0.2}$ UCNPs synthesized by heating to 300° C. for 5 minutes.

FIG. 3 shows a transmission electron microscopy (TEM) image of NaYF$_4$:ER$_{0.02}$, Yb$_{0.2}$ UCNPs synthesized by heating a precursor solution to 300° C. for 5 minutes.

Figure 4:
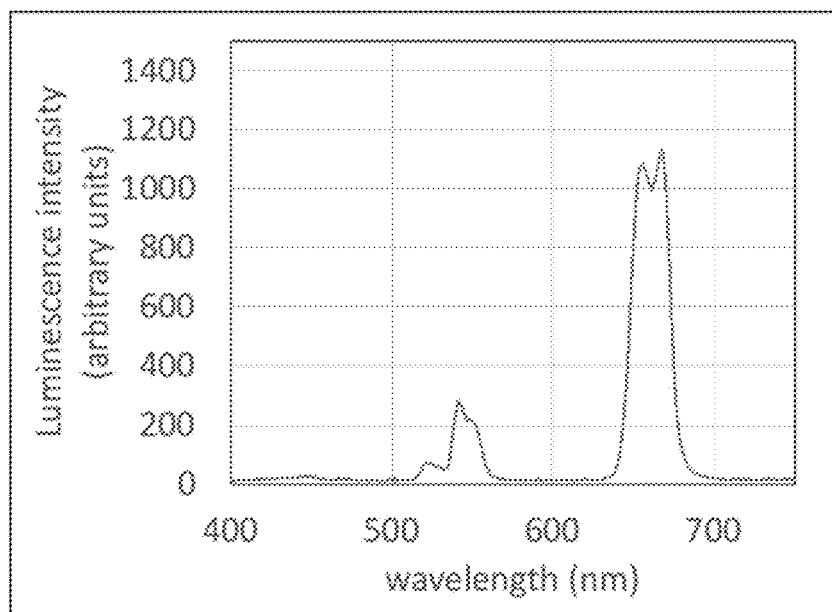
FIG. 4 shows typical luminescence for $NaYF_4:Er_{0.02}, Yb_{0.2}$ excited with a 980 nm laser.
Figure 6:
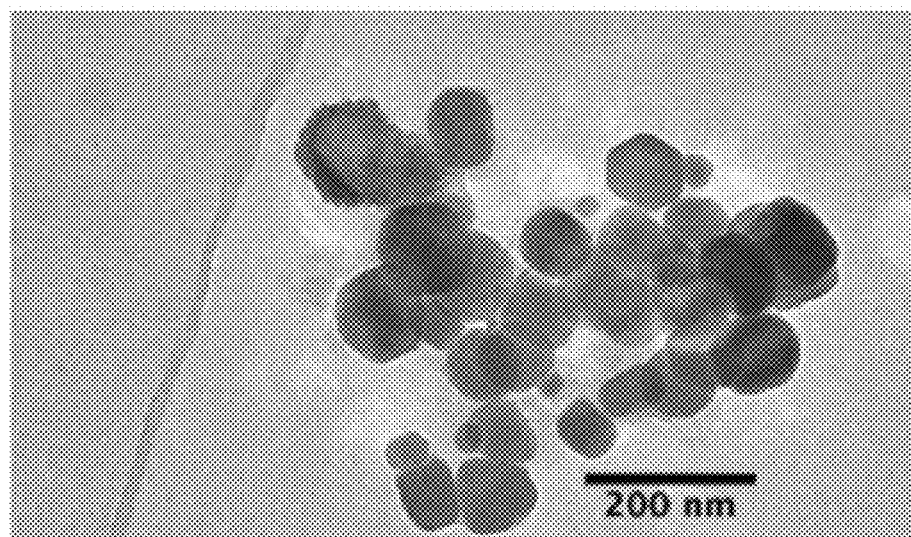
FIG. 6 is a TEM image of UCNPs having a cubic crystal system.

FIG. 4 shows typical luminescence for NaYF$_4$:Er$_{0.02}$, Yb$_{0.2}$ excited with a 980 nm laser.

EXAMPLES

Example 1. Trifluoroacetate (TFA) salts of sodium, yttrium, ytterbium, and erbium were dissolved in a mix of oleic acid and di-butyl-phthalate at different ratios by first heating the solution at 120° C. for 10 minutes, followed by heating at 315° C. for 10 to 120 minutes. Trifluoroacetate salts and di-n-butyl phthalate are good microwave absorbers and allow the temperature to rise from 120° C. to 315° C. in approximately 5 minutes. The microwave reactor was a CEM Discover using single mode and continuous power at 2.45 GHz.

Colloidal nanoparticle dispersions in 2-propanol at 5 mg/ml were excited with a 500 mW, 980 nm laser. The lifetimes of the green (540 nm) and the red (655 nm) emission were obtained by exciting the samples with 10 ms laser pulses. The emitted light was focused on a Jobin-Yvon HR spectrometer, and detected using a photomultiplier and an averager oscilloscope. The lifetime of these nanoparticles ranges from 200 to 150 µs at 540 nm, and from 320 to 250 µs at 655 nm, and follows a decreasing trend with increasing synthesis time.

Example 2. A single mode 2.45 GHz microwave reactor (Discover, CEM, Matthews NC, USA) equipped with a high temperature PTFE-spill cup and an immersion optical fiber thermometer supplied by its manufacturer was used. All pure solvents were degassed under vacuum and magnetic stirring at room temperature for at least 30 minutes prior to being used. A stock rare-earth precursor solution was prepared in advance and stored up to two months before use. Briefly, a 100 mM total rare earth concentration solution was prepared in advance and stored. 20 mL of oleic acid was degassed under vacuum and stirred for at least 30 minutes in a round bottom flask. Reagents were mixed in stoichiometric proportions to obtain NaY$_{0.78}$F$_4$:Yb$_{0.2}$, Er$_{0.02}$. Briefly, 773.05 mg YTFA (TFA=trifluoroacetate), 151.98 mg YbAc (Ac=acetate), 14.99 mg ErAc, 205.2 mg NaTFA, and 125.19 mg NaAc were added to the flask. The mixture was heated to 100° C. in a microwave reactor under argon flow and stirred for 10 minutes. The stock precursor solution was stored at room temperature for a minimum of 45 minutes before using it, and up to two months.

An aliquot of the nanoparticle precursor stock solution was combined with an oleic acid (OA): bis(2-ethylhexyl) adipate (BEHA) mixture at different proportions (S1 to S6, see Table 2) into a 125 mL round-bottom flask. The flask was placed in a microwave cavity and kept under a gentle argon flow and stirring using a glass-coated magnet for 10 minutes, and then heated to 300° C. for 5-45 minutes. At the end of the heating program the flask was cooled down to room temperature by a stream of compressed air.

TABLE 2

Synthesis parameters

| Sample | OA (% v/v) | BEHA (% v/v) |
|---|---|---|
| S1 | 80.0 | 20.0 |
| S2 | 65.0 | 35.0 |
| S3 | 50.0 | 50.0 |
| S4 | 35.0 | 65.0 |
| S5 | 16.7 | 83.3 |
| S6 | 8.4 | 91.7 |

Scaled-up continuous flow synthesis: The mixture of the nanoparticle stock precursor solution with oleic acid and a carboxylic acid ester was flowed through microwave reactor coils to heat it to a temperature above 280° C. with a residence time from 5 to 45 minutes.

Figure 5:
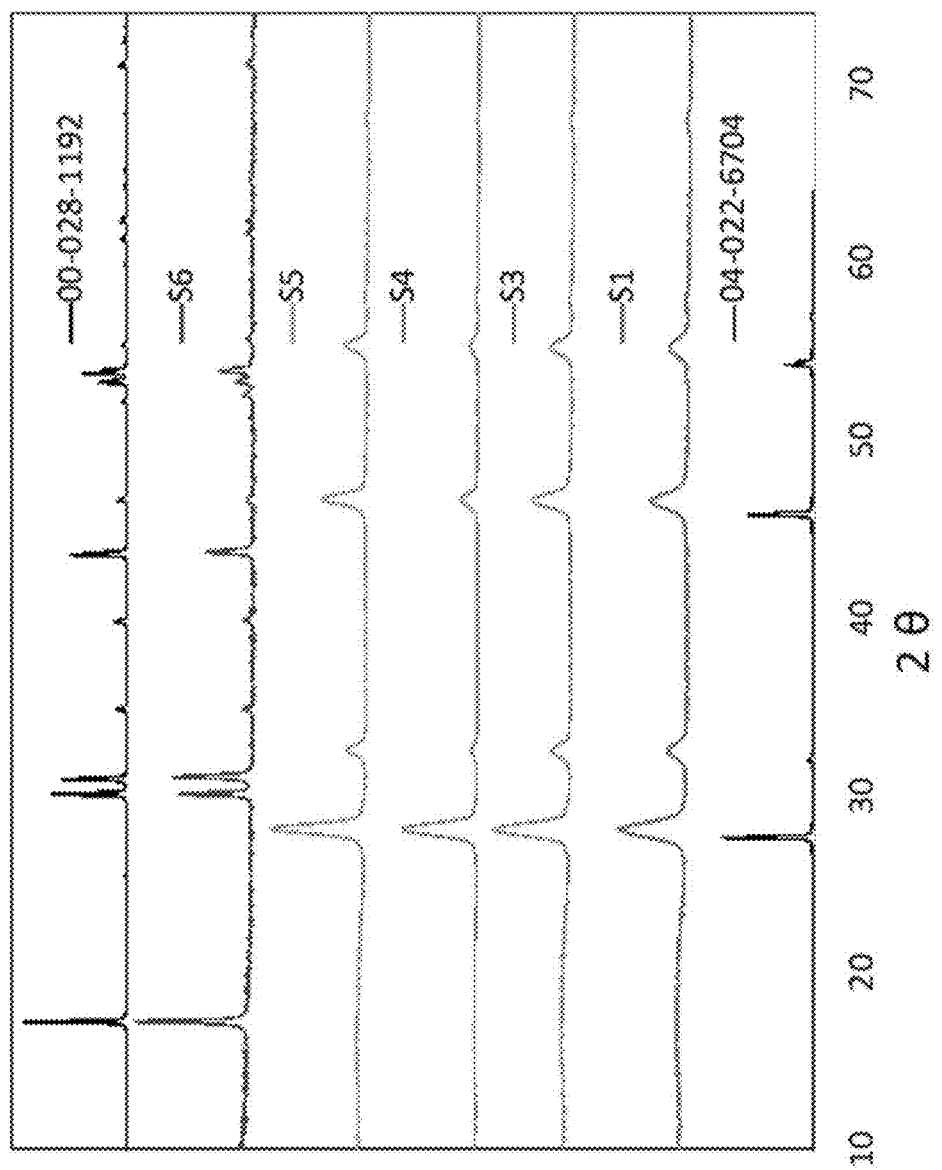
FIG. 5 shows X-ray diffraction patterns of UCNPs as a function of solvent composition.

FIG. 5 shows X-ray diffraction patterns of the resulting UCNPs as a function of the OA-BEHA ratio. Sample S1 was consistent with sodium erbium ytterbium yttrium fluoride (reference code 04-022-6704) with an empirical formula of Er$_{0.01}$FY$_2$Na$_{0.5}$Y$_{0.39}$Yb$_{0.1}$ and having a cubic crystal structure. Sample S6 was seen to be consistent with sodium erbium ytterbium yttrium fluoride (reference code 00-028-1192) with an empirical formula of Er$_{0.04}$F$_4$NaY$_{0.57}$Yb$_{0.39}$ (chemical formula Na(Y$_{0.57}$Yb$_{0.39}$Er$_{0.04}$)F$_4$ and having a hexagonal crystal structure. FIG. 5 is a transmission electron microscopy image of Sample S5, prepared with a microwave residence time of 15 minutes at 300° C. The nanoparticles have a hexagonal crystalline structure, and diameters ranging from about 40 nm to about 130 nm, with a majority of the nanoparticles having a diameter of about 100 nm.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of synthesizing upconverting nanoparticles, the method comprising:
   heating a precursor solution comprising two or more rare earth salts, an alkali metal salt or an alkaline earth salt, and a solvent in a microwave reactor to yield a product mixture; and
   cooling the product mixture to yield the upconverting nanoparticles,
   wherein at least one of the two or more rare earth salts comprises trifluoroacetate and at least one of the two or more rare earth salts comprises acetate, and the solvent comprises oleic acid and a plasticizer including one or both of dioctyl terephthalate and bis(2-ethylhexyl) adipate.

2. The method of claim 1, wherein the two or more rare earth salts comprise one or more of yttrium, ytterbium, and erbium.

3. The method of claim 1, wherein a boiling point of the plasticizer at atmospheric pressure is at least 320° C.

4. The method of claim 1, wherein a dielectric permittivity of the plasticizer is at least 4.

5. The method of claim 1, wherein the plasticizer further comprises dibutyl phthalate.

6. The method of claim 1, comprising heating the precursor solution to a temperature of at least 280° C.

7. The method of claim 6, comprising heating the precursor solution to a temperature of at least 305° C.

8. The method of claim 1, wherein heating the product mixture comprises heating for a length of time between 5 minutes and 45 minutes.

9. The method of claim 1, further comprising flowing the precursor solution through the microwave reactor.

10. A method of synthesizing core-shell upconverting nanoparticles, the method comprising:
    heating a precursor solution comprising two or more rare earth metal salts, an alkali metal salt or an alkaline earth metal salt, and a solvent in a microwave reactor;
    combining the upconverting nanoparticles of claim 1 with the precursor solution to yield a nanoparticle mixture;
    heating the nanoparticle mixture in the microwave reactor to yield a product mixture; and
    cooling the product mixture to yield the core-shell upconverting nanoparticles,
    wherein at least one of the two or more rare earth salts comprises trifluoroacetate and at least one of the two or more rare earth salts comprises acetate, and the solvent comprises oleic acid and a plasticizer including one or both of dioctyl terephthalate and bis(2-ethylhexyl) adipate.

11. The method of claim 10, wherein the upconverting nanoparticles comprise cubic nanoparticles.

12. The method of claim 10, wherein the upconverting nanoparticles comprise hexagonal nanoparticles.

13. The method of claim 10, wherein a boiling point of the plasticizer at atmospheric pressure is at least 320° C.

14. The method of claim 10, wherein a dielectric permittivity of the plasticizer is at least 4.

15. The method of claim 10, wherein the plasticizer further comprises dibutyl phthalate.

16. The method of claim 10, comprising heating the precursor solution to a temperature of at least 280° C.

17. The method of claim 10, comprising heating the precursor solution to a temperature of at least 305° C.

18. The method of claim 10, further comprising flowing the precursor solution through the microwave reactor.

* * * * *

UNITED STATES PATENT AND TRADEMARK OFFICE
CERTIFICATE OF CORRECTION

| | | |
|---|---|---|
| PATENT NO. | : 12,017,924 B2 | Page 1 of 1 |
| APPLICATION NO. | : 18/296501 | |
| DATED | : June 25, 2024 | |
| INVENTOR(S) | : Ana Egatz-Gomez and Alexandra Ros | |

It is certified that error appears in the above-identified patent and that said Letters Patent is hereby corrected as shown below:

On the Title Page

Column 2, Item (56) OTHER PUBLICATIONS, Line 1, delete "al,," and insert -- al., --.

In the Claims

Claim 17, Column 8, Line 31, delete "claim 10," and insert -- claim 16, --.

Signed and Sealed this
Seventeenth Day of December, 2024

Derrick Brent
*Acting Director of the United States Patent and Trademark Office*